United States Patent [19]
Klatt et al.

[11] Patent Number: 5,877,488
[45] Date of Patent: Mar. 2, 1999

[54] COMBINATION CHIP CARD READER

[75] Inventors: Dieter Klatt, Wülfrath; Bernhard Pelke, Wuppertal, both of Germany

[73] Assignee: Stocko Metallwarenfabriken Henkels Und Sohn GmbH, Wuppertal, Germany

[21] Appl. No.: 842,162

[22] Filed: Apr. 22, 1997

[30] Foreign Application Priority Data

Apr. 22, 1996 [DE] Germany ................ 296 07 253 U

[51] Int. Cl.⁶ .................................................. G06K 7/01
[52] U.S. Cl. ........................................... 235/486; 235/492
[58] Field of Search .................................. 235/486, 492, 235/454

[56] References Cited

U.S. PATENT DOCUMENTS

| | | | |
|---|---|---|---|
| 4,743,746 | 5/1988 | Murschall et al. | 235/486 |
| 5,254,988 | 10/1993 | Nakano | 235/454 |
| 5,477,418 | 12/1995 | MacGregor et al. | 361/737 |
| 5,673,180 | 9/1997 | Pernet | 361/756 |
| 5,729,000 | 3/1998 | Sugimoto | 235/441 |
| 5,780,836 | 7/1998 | Iguchi et al. | 235/486 |
| 5,796,085 | 8/1998 | Bleier | 235/441 |

FOREIGN PATENT DOCUMENTS

| | | |
|---|---|---|
| 0195865 | 10/1986 | European Pat. Off. . |
| 0552078 | 7/1993 | European Pat. Off. . |
| 4008655 | 8/1991 | Germany . |
| 9405615 | 8/1994 | Germany . |
| 4310517 | 10/1994 | Germany . |
| 4432028 | 3/1995 | Germany . |
| 29506344 | 9/1995 | Germany . |
| 29514654 | 12/1995 | Germany . |

*Primary Examiner*—Anita Pellman Gross
*Assistant Examiner*—Drew A. Dunn
*Attorney, Agent, or Firm*—Robert W. Becker & Associates

[57] ABSTRACT

A contacting unit for a card-shaped carrier element of electronic components has a housing with a base plate and a contact field provided at a side of the housing leading when inserted into a computing device. A PCMCIA card is placed into the housing parallel to the base plate such that between the base plate and the PCMCIA card an insertion channel for a chip card is formed. The housing has an insertion slot for inserting a chip card into the insertion channel. The insertion slot is arranged opposite the contact field. Contact elements are connected to a face of the PCMCIA card for contacting the chip card inserted into the insertion channel. An insertion guide surrounds the insertion slot. The insertion guide has lateral cover portions extending to the leading side of the housing. Abutments are connected to the housing in the vicinity of the contact field for limiting an insertion depth of the chip card into the insertion channel. The abutments are positioned so as to cooperate with corners of the leading edge of the chip card. The abutments have a contour slant or a contour radius matching the contour slant or contour radius of the corners of the leading edge of the chip card.

15 Claims, 2 Drawing Sheets

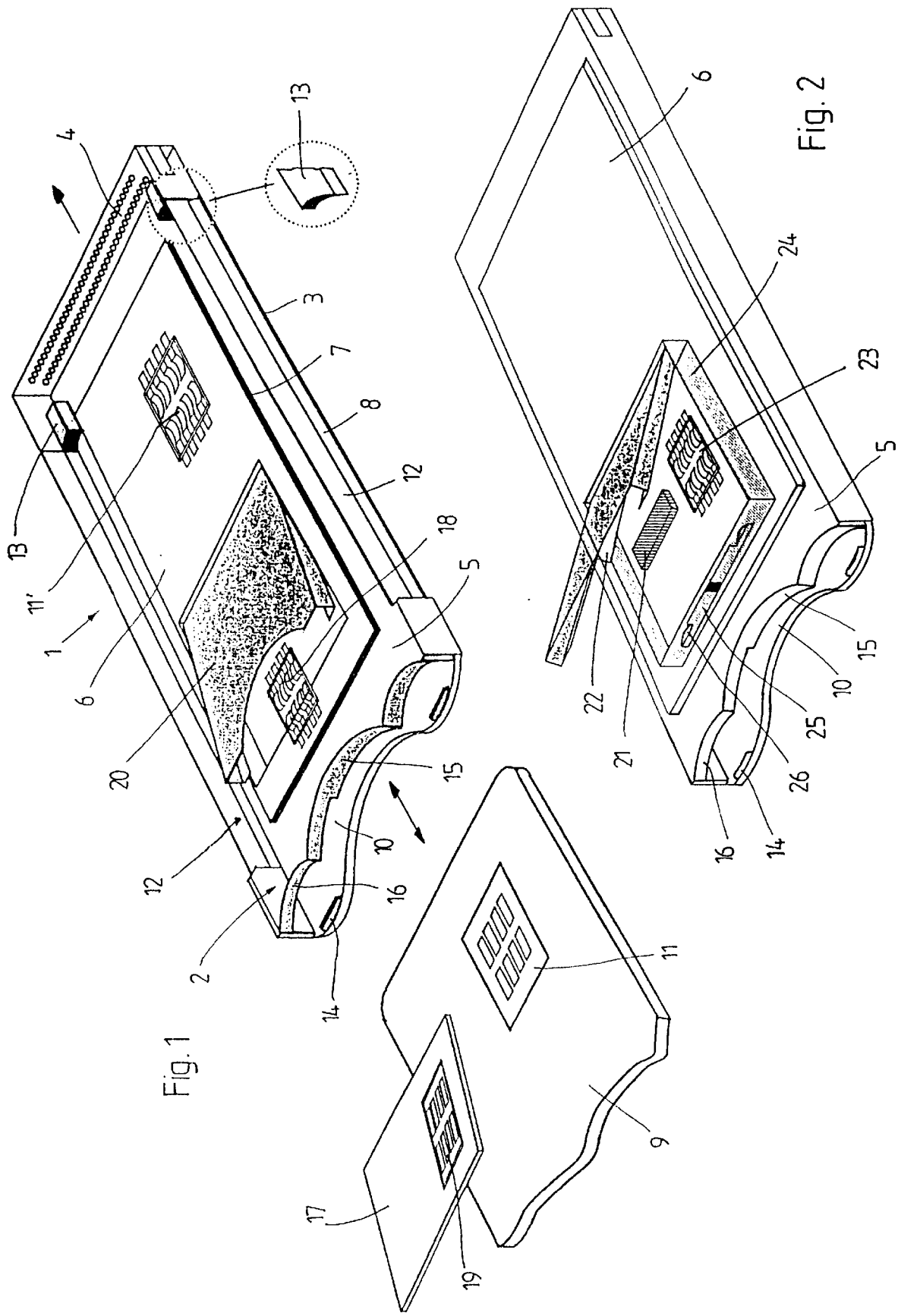

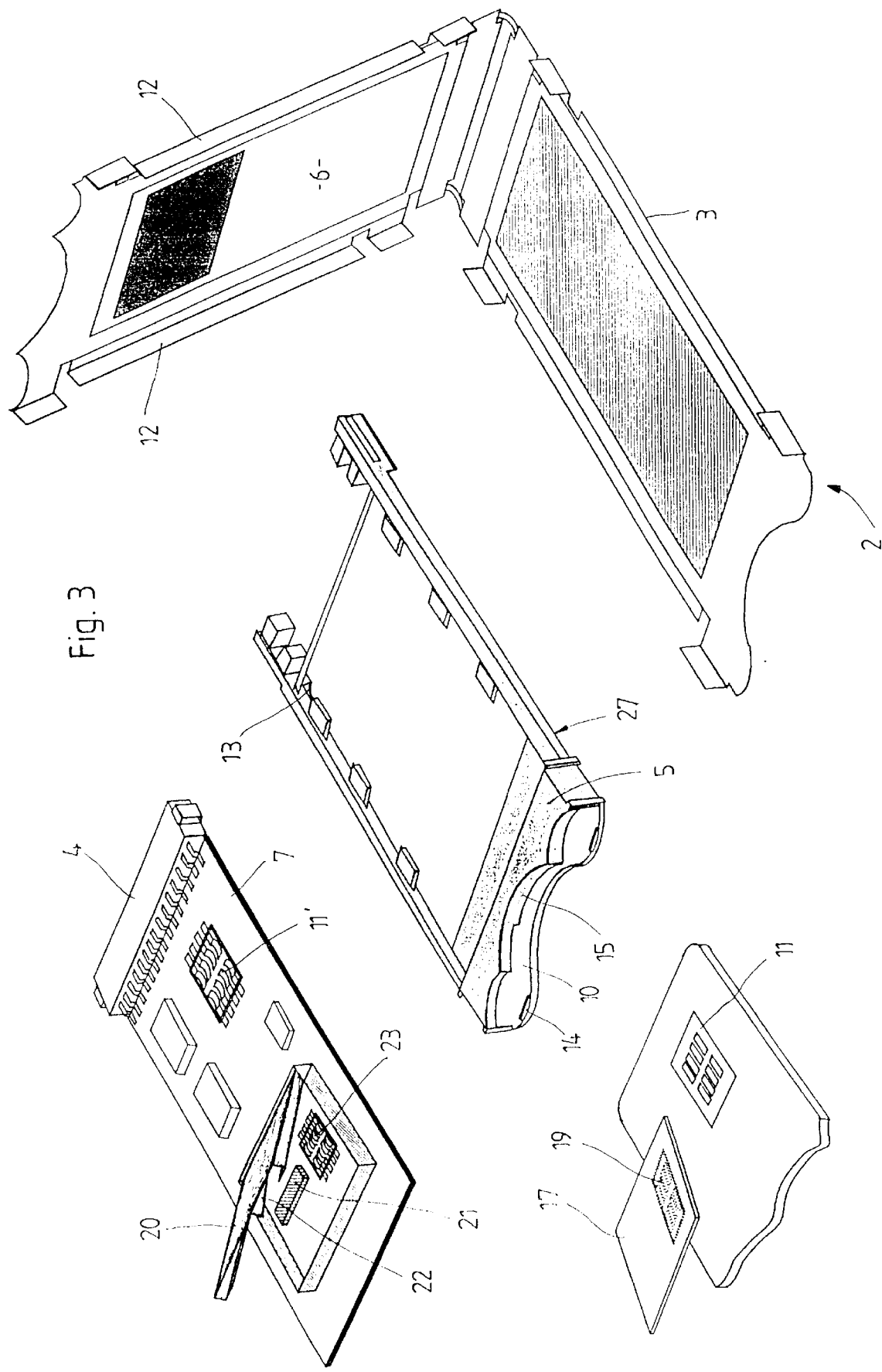

COMBINATION CHIP CARD READER

BACKGROUND OF THE INVENTION

The present invention relates to a contacting unit for a card-shaped carrier element of electronic components, especially a PCMCIA card, which is provided, in addition to the contact field at the edge of the contacting unit, with contact elements at a face thereof for contacting a chip card which is inserted parallel to the PCMCIA card into a slot-shaped insertion channel of the housing of the contacting unit. The insertion channel between a base plate of the housing and especially the PCMCIA card is laterally open and has an insertion guide at the end of the contacting unit opposite the contact field.

In the field of computer technology electronic components are preferably arranged on card-shaped carrier elements. These have contacting areas and are insertable into contacting units where they are electrically contacted and integrated into the data processing circuit. These carrier elements include the so-called chip cards which are for example used as telephone cards. They have contacting fields arranged on surfaces thereof for contacting a chip and are inserted into the card readers of contacting units.

Furthermore, card-shaped carrier elements according to PCMCIA standard are known which have a standardized matrix-like plug-in contacting field at their leading insertion edge and further comprise various IC circuits. Such cards can be used as memory expansion cards, hard disc cards, modem cards etc. They can be contacted in contacting units with a corresponding pin matrix for which purpose they are inserted into the insertion slot, for example, of a computer.

From European Patent Application 0 552 078 A1 a combination of such card systems is known so that simultaneously a PCMCIA card and a chip card can be inserted into a corresponding modular receiving slot of a computer for reading and processing. It is disadvantageous that the contact fields are exposed and that the chip card is insufficiently guided whereby the chip card is furthermore moveable, even in its operating position, relative to the PCMCIA card so that proper contacting can not be ensured.

A special embodiment of chip card receiving units and possibilities for a simple connection to a computer have been suggested in German Patent Application 43 10 517 A1 in which at the contacting unit of the PCMCIA card an insertion channel for the chip card and an insertion guide are provided which have an area projecting relative to the PCMCIA card in order to provide for a safe insertion of the entire contacting unit into the modular receiving slot of the computer. Disadvantageously, this suggestion however deviates greatly from the standardized embodiment of the PCMCIA card and can also not ensure that the chip card is held securely and non-displacably within the contacting position. A safe operation in the sense of repeated use in connection with automated devices etc. can not be ensured with the known contacting unit. Furthermore, due to the laterally open construction of the housing, the mechanical stability of the contacting unit and its torsional stiffness are minimal so that the functional reliability during its service life is at risk.

Accordingly, it is an object of the present invention to improve a contacting unit of the aforementioned kind so that the aforementioned disadvantages can be avoided. The contacting unit should ensure a safe securing, contacting, and guiding in the combination of a PCMCIA card with one or more additional insertable chip cards and should have a housing that allows, for smallest dimensions, a high torsional stiffness, stability, and thus permanency.

SUMMARY OF THE INVENTION

A contacting unit for a card-shaped carrier element of electronic components according to the present invention is primarily characterized by:

A housing comprising a base plate and a contact field provided at a side of the housing leading when inserted into a computing device;

A PCMCIA card placed into the housing parallel to the base plate such that between the base plate and the PCMCIA card an insertion channel for a chip card is formed;

The housing having an insertion slot for inserting a chip card into the insertion channel, the insertion slot arranged on a rear side of the housing opposite the contact field;

Contact elements connected to a face of the PCMCIA card for contacting a chip card inserted with the leading edge into the insertion channel;

An insertion guide surrounding the insertion slot;

The insertion guide having lateral cover portions extending from the rear side of the housing to the leading side of the housing;

Abutments connected to the housing in the vicinity of the contact field for limiting an insertion depth of the chip card into the insertion channel, the abutments positioned so as to cooperate with corners of the leading edge of the chip card;

The abutments having a contour slant or a contour radius matching a contour slant or a contour radius of the corners of the leading edge of the chip card.

Advantageously, the insertion guide has a releasable locking mechanism at the insertion slot for securing the chip card within the insertion channel.

The locking mechanism is comprised of two clamping projections cooperating with the abutments.

Advantageously, the housing further comprises a frame for securing the PCMCIA card, the frame having a first end to which is connected the insertion guide and a second end to which are connected the abutments, wherein the insertion channel is delimited by the abutments and the clamping projections and wherein the lateral cover portions cover the frame over a thickness of the PCMCIA card and leave the insertion channel laterally open.

The frame is preferably a unitary plastic part. The housing advantageously further comprises a cover, and the cover and the base plate are formed as unitary sheet metal member. The frame, the base plate, and the cover are connected to form a structural unit.

The housing preferably further comprises a cover having laterally downwardly bent strips forming the lateral cover portions.

The cover is sheet metal plate bent to have a U-shaped cross-section.

The insertion guide has insertion slants, and an area of the insertion guide opposite the clamping projections has cutouts.

The contacting unit may further comprise a foldable mini chip card receiving unit connected to a face of the housing, wherein the PCMCIA card has at least one additional electric contacting element for contacting the foldable mini chip card receiving unit. Insertion of the mini chip card into and removal thereof from the receiving unit is performed when the receiving unit is folded open. Electrical contacting for performing a reading function is achieved when the receiving unit is closed.

The at least one additional electric contacting element is a plug or a conductive rubber strip.

The receiving unit has at least one stay for dividing the receiving unit into a plurality of compartments for receiving a plurality of mini chip cards so that the PCMCIA card is combined with a chip card according to DIN-ISO 7816 and at least one mini chip card.

The base plate has a window of a size matching a size of chip card reader for personalizing the module with a foreign card system.

Preferably, the receiving unit includes a cassette mechanism with a locking and release function, wherein the release function is inoperative when the contacting unit is inserted into the computing device. In an open position of the receiving unit, a subsequent closing of the receiving unit provides a self-cleaning action for the at least one additional electric contact element by the contact surfaces frictionally contacting one another.

The receiving unit preferably comprises biasing and securing springs for moving the inserted mini chip card into a desired contacting position.

Advantageously, the receiving unit has lateral pressure springs for clamping the inserted mini chip card and preventing the mini chip card from falling out of the receiving unit.

According to the present invention, the insertion guide for the chip card extends past the insertion area in the form of lateral cover portions into the area of the contact field. At the contact field two abutments are provided which limit the insertion depth for the chip card. The abutments are positioned at so as cooperate with the corners of the leading edge of the chip card. The abutments match the corner shape of the chip card with respect to contour slant or contour radius. This increases overall the stability of the contacting unit overall to a substantial degree, and a safe positioning of the inserted chip card within the contacting unit is provided. A further improvement according to an expedient embodiment of the invention can be provided by furnishing the insertion guide for the chip card with a locking mechanism, preferably in the form of two clamping projections cooperating with the abutments, so that the chip card is secured in its end position but can be released, when needed.

Advantageously, the contacting unit is comprised of a housing with a frame that secures the printed circuit board of the PCMCIA card. One end face of the frame has arranged thereat the insertion guide and the other end face has arranged thereat the contact field. They are connected to one another by the base plate extending parallel to the printed circuit board so that an insertion channel for the chip card is formed which is delimited at one end by the two abutments and at the opposite end by the clamping projections. The lateral cover portions between the insertion guide and the contact field at the leading side of the housing cover the frame up to the thickness of the circuit board of the PCMCIA card and leave the insertion channel open laterally. Advantageously, the lateral cover portions are provided at a cover that covers the frame in the upward direction, whereby the cover is preferably made of sheet metal and the lateral projections are provided by bending the sheet metal into a U-shaped cross-sectional form so that strip-like bent portions are provided. This further increase the stability of the housing.

A further suggestion of the invention for achieving the same goal, i.e., to reinforce the housing, is that the frame be a one-piece plastic part connected to the base plate and the cover element so as to form a structural unit, whereby, the base plate and the cover element (cover) are formed as a unitary sheet metal member. The insertion guide, in an expedient embodiment of the invention, can be provided with insertion slants and the area of the insertion guide opposite the clamping projections can be provided with cutouts so as to provide a recessed portion relative to the projections in order to facilitate the insertion, locking, and removal of the chip card.

In order to expand on the field of use of the inventive contacting unit, and this is possible due to its increased stability and compact design, it is advantageously suggested to provide on the PCMCIA printed circuit board at least one additional electric contact element, especially a plug, via which a mini chip card receiving unit can be electronically contacted. The receiving unit is foldable into and out of the surface of the contacting unit. Insertion and removal of the mini chip card is performed when the cassette is folded open, while in the closed state electrical contacting especially for a reading function is performed. The electric contacting element is preferably a conductive rubber strip. The mini chip card receiving unit can be divided by one or a plurality of stays into compartments for receiving a plurality of mini chip cards so that a combination chip card reading device can be provide that combines a PCMCIA card with a chip card according DIN-ISO 7816 and one or more mini chip cards. Such a contacting unit according to the present invention allows the introduction of chip and mini chip cards without having to widen the card guiding area also for a PCMCIA standard reading system for the card types I, II, or III. In addition, the base plate may be provide with a window having the size of a chip card reader in order to be thus able to perform a personalization of the module with a foreign card system, for example, for after-loading the reader with additional data or changes.

Expediently, the mini chip card receiving unit has a cassette mechanism with a locking and release function, preferably in an arrangement in which the release function is inoperative in the inserted state of the contacting unit. Via the slanted cassette position in the folded open position, during closing a contact self-cleaning action is provided in that contact surfaces of the chip and the electrical contacting element are subjected to frictional contact. The cassette is closed when in operation, so that the contacting elements protected against soiling and access when the cassette is closed. It may be advantageous in this context to provide within the mini chip card receiving unit pressure or securing springs with which the inserted mini chip card can be brought into the correct contact position for proper function. It is furthermore possible to provide lateral pressure springs which secure laterally the inserted card and also provide protection against the card falling out of the open cassette.

BRIEF DESCRIPTION OF THE DRAWINGS

The object and advantageous of the present invention will appear more clearly from the following specification in conjunction with the accompanying drawings in which:

FIG. 1 is a contacting unit shown perspectively with a chip card ready for insertion;

FIG. 2 shows a modified contacting unit;

FIG. 3 is an exploded view of the contacting unit of FIG. 2.

DESCRIPTION OF PREFERRED EMBODIMENTS

The present invention will now be described in detail with the aid of specific embodiments utilizing FIGS. 1–3.

The embodiment of the invention represented in FIG. 1 shows a combination chip card reader in the form of a contacting unit 1 which can be contacted by a computer via a standardized PCMCIA interface. The contacting unit is comprised of a housing 2 with a base plate 3, a contact field 4 at the leading edge of the card (viewed in the direction of insertion indicated by the arrow), an insertion guide 5 at the opposite end, and a cover 6 extending parallel at a distance to the base plate 3. The cover, like the base plate 3, rigidly connects the connecting field 4 with the insertion guide 5. The base plate 3 and the cover 6 are a unitary sheet metal member as shown in FIG. 3. The aforementioned elements are supported by an interior frame 27 made of PCB (see FIG. 3) which secures a PCMCIA circuit board 7 at a distance parallel to the base plated 3 such that therebetween an insertion channel 8 for an ISO 7816 chip card 9 is provided that can be inserted via insertion slot 10 at the insertion guide 5 into the contacting unit 1. The chip card 9 can be inserted in the direction of the shown double arrow into the contacting unit 1 and can be remove therefrom. Contacting is provided via the chip field 11 of the chip card 9 and the contacting elements 11' at the underside of the PCMCIA printed circuit board 7 to allow processing of the chip card via the PCMCIA card when the latter is inserted into the insertion slot of an electronic computing device and connected via the contact field 4 to the PCMCIA interface of the computing device.

The cover 6 is comprised, like the base plate 3, of sheet metal and is laterally bent to a U-shaped cross section in order to provide the lateral sheet-metal cover portions 12 at both longitudinal sides of the contacting unit 1. The portions 12 cover the PCB frame 27, respectively, the PCMCIA printed circuit board 7 up to the lower longitudinal edge in order to provide a complete lateral housing enclosure of the printed circuit board 7. The cover element or cover 6 and optionally the cover portions 12 are fixedly connected to the insertion guide 5 and to the contact field 4, especially by fusing or welding, in order to provide a torsionally stiff housing 2 that is reinforced by the frame 27. The lateral area between the cover portions 12 and the base plate 3 remain open so that the chip card guide area is without cover and the total width of the contacting unit 1 within the computer insertion area corresponds only to the standardized width of the ISO chip card 9. In order to provide for a secure positioning, locking, and contacting of the chip card 9 inserted into the insertion channel 8 despite the laterally open chip card guide area, two abutments 13 are provided at the corners of the leading side of the housing adjacent to the contact field 4. The abutments 13 provide contacting surfaces for the chip card 9 that match, in regard to their corner radius or corner slant, the design of the chip card corners so that a centered guiding of the chip card movement into the desired position during insertion is possible. Thus, the insertion movement of the chip card 9 into the insertion channel 8 is guided by the insertion guide 5 as well as, in the end position, by the abutments 13 the shape of which can be seen in FIG. 1 in the encircled area showing an enlarged detail of the abutments 13.

The base plate 3, at the insertion slot 10 of the insertion guide 5, approximately opposite to the abutments 13, is provided with slightly upwardly extending clamping projections 14 made of metal or plastic which secure the inserted chip card 9 within the insertion channel 8 in order to prevent accidental sliding out of the insertion channel 8. The chip card 9 is thus locked in the transverse as well as in the longitudinal direction. For improved insertion of the chip card 9, it is possible to provide insertion slants at the clamping projections 14 and/or the insertion slot 10. For facilitating removal of the inserted and position-secured (locked) chip card 9, the cover 6 and/or the base plate 3 is provided with cutouts 15 centrally arranged and having a part-circular contour. The cutouts 15 allow the operator easy access to the chip card. In addition, in the area of the clamping projections 14, the cover 6 is provided with part-circular cutouts in order to facilitate insertion and locking of the chip card 9.

With a contacting unit 1 embodied as a combination chip card reader it is furthermore possible to access and process an additional mini chip card 17 by providing an electric contacting element 18 on the PCMCIA printed circuit board 7 that provides a connection to the integrated circuit of the PCMCIA card and can be contacted with the correspondingly arranged chip field 19 of the mini chip card 17. For securing the mini chip card, a foldable cassette receiving unit 20 is arranged above the contacting element 18. It can be folded into and out of the cover 6 that, for this purpose, has a respective cutout. In FIG. 1, the open position (folded open position) is shown which allows introduction of mini chip card 17 therein. After insertion into the cassette compartment, the cassette is folded downwardly into the plane of the cover 6, and the mini chip card is thus contacted via the chip field 19 and the contacting element 18 to the PCMCIA card. The contacting element 18 can be in the form of a plug or in the form of a conductive rubber strip 21, according to FIG. 2. In the embodiment shown in FIG. 2, the contacting unit has a cassette part that is divided by a longitudinal stay 22 into two compartments which receive small mini chip memory cards that can be contacted by the conductive rubber strip 21 on the left side and by the plug 23 on the right side.

The cassette receiving unit of FIG. 2 comprises a cassette frame 24 placed onto the cover 6 and having pivot joints for providing the folding mechanism. A release and locking mechanism 25 is also provided thereat. Due to the slanted cassette position for loading having a certain slant angle, a contact self-cleaning action is provided during closing because the two contact surfaces, when closing the cassette, frictionally contact one another with a frictional edge that changes it position. By providing a cassette that is closed during operation (reading etc.), the contacting elements are also protected against access and soiling.

Pressure and securing springs 26 are arranged at the cassette frame adjacent to the locking mechanism 25 with which the inserted chip cards are brought into the desired contacting position. In addition, the cassette receiving unit 20 can have lateral pressure springs which clamp the cards laterally and protect them from falling out of the cassette when the cassette is open.

The present invention is, of course, in no way restricted to the specific disclosure of the specifications, and drawings, but also encompasses any modifications within the scope of the appended claims.

What we claim is:

1. A contacting unit for a card-shaped carrier element of electronic components, said contacting unit comprising:

a housing comprising a base plate and a contact field provided at a side of said housing leading when inserted into a computing device;

a PCMCIA card placed into said housing parallel to said base pate such that between said base plate and said PCMCIA card an insertion channel for a chip card is formed;

said housing having an insertion slot for inserting a chip card into said insertion channel, said insertion slot arranged on a rear side of said housing opposite said contact field;

contact elements connected to a face of said PCMCIA card for contacting a chip card inserted with a leading edge into said insertion channel;

an insertion guide surrounding said insertion slot;

said insertion guide having lateral cover portions extending from said rear side of said housing to said leading side of said housing;

abutments connected to said housing in the vicinity of said contact field for limiting an insertion depth of the chip card into said insertion channel, said abutments positioned so as to cooperate with corners of the leading edge of the chip card;

said abutments having a contour slant or a contour radius matching a contour slant or a contour radius of the corners of the leading edge of the chip card.

2. A contacting unit according to claim 1, wherein said insertion guide has a releasable locking mechanism at said insertion slot for securing the chip card within said insertion channel.

3. A contacting unit according to claim 2, wherein said locking mechanism is comprised of two clamping projections cooperating with said abutments.

4. A contacting unit according to claim 3, wherein said housing further comprises a frame for securing said PCMCIA card, said frame having a first end to which is connected said insertion guide and having a second end to which are connected said abutments, wherein said insertion channel is delimited by said abutments and said clamping projections and wherein said lateral cover portions cover said frame over a thickness of said PCMCIA card and leave said insertion channel laterally open.

5. A contacting unit according to claim 4, wherein:

said frame is a unitary plastic part;

said housing further comprises a cover;

said cover and said base plate are formed as a unitary sheet metal member;

said frame, said base plate, and said cover are connected to form a structural unit.

6. A contacting unit according to claim 4, wherein said housing further comprises a cover having laterally downwardly bent strips forming said lateral cover portions.

7. A contacting unit according to claim 6, wherein said cover is a sheet metal plate bent to have a U-shaped cross-section.

8. A contacting unit according to claim 3, wherein said insertion guide has insertion slants and wherein an area of said insertion guide opposite said clamping projections has cutouts.

9. A contacting unit according to claim 1, further comprising a foldable mini chip card receiving unit connected to a face of said housing, wherein said PCMCIA card has at least one additional electric contacting element for contacting said foldable mini chip card receiving unit, wherein insertion of the mini chip card into and removal thereof from the receiving unit is performed when said receiving unit is folded open, and wherein electrical contacting for performing a reading function is achieved when said receiving unit is closed.

10. A contacting unit according to claim 9, wherein said at least one additional electric contacting element is a plug or a conductive rubber strip.

11. A contacting unit according to claim 9, wherein said receiving unit has at least one stay for dividing said receiving unit into a plurality of compartments for receiving a plurality of mini chip cards so that said PCMCIA card is combined with a chip card according to DIN/ISO 7816 and at least one mini chip card.

12. A contacting unit according to claim 9, wherein said base plate has a window of a size matching a size of a chip card reader for personalizing the module with a foreign card system.

13. A contacting unit according to claim 9, wherein said receiving unit includes a cassette mechanisms with a locking and release function, wherein the release function is inoperative when said contacting unit is inserted into the computing device, and wherein in an open position of said receiving unit with a subsequent closing of said receiving unit a self-cleaning action for said at least one additional electric contact element is provided by the contact surfaces frictionally contacting one another.

14. A contacting unit according to claim 9, wherein said receiving unit comprises biasing and securing springs for moving the inserted mini chip card in a desired contacting position.

15. A contacting unit according to claim 9, wherein said receiving unit has lateral pressure springs for clamping the inserted mini chip card and preventing the mini chip card from falling out of said receiving unit.

\* \* \* \* \*